Aug. 18, 1959        R. L. SCHUHMANN ET AL        2,900,140
                         COFFEE GRINDER
Filed April 2, 1957                        2 Sheets-Sheet 1
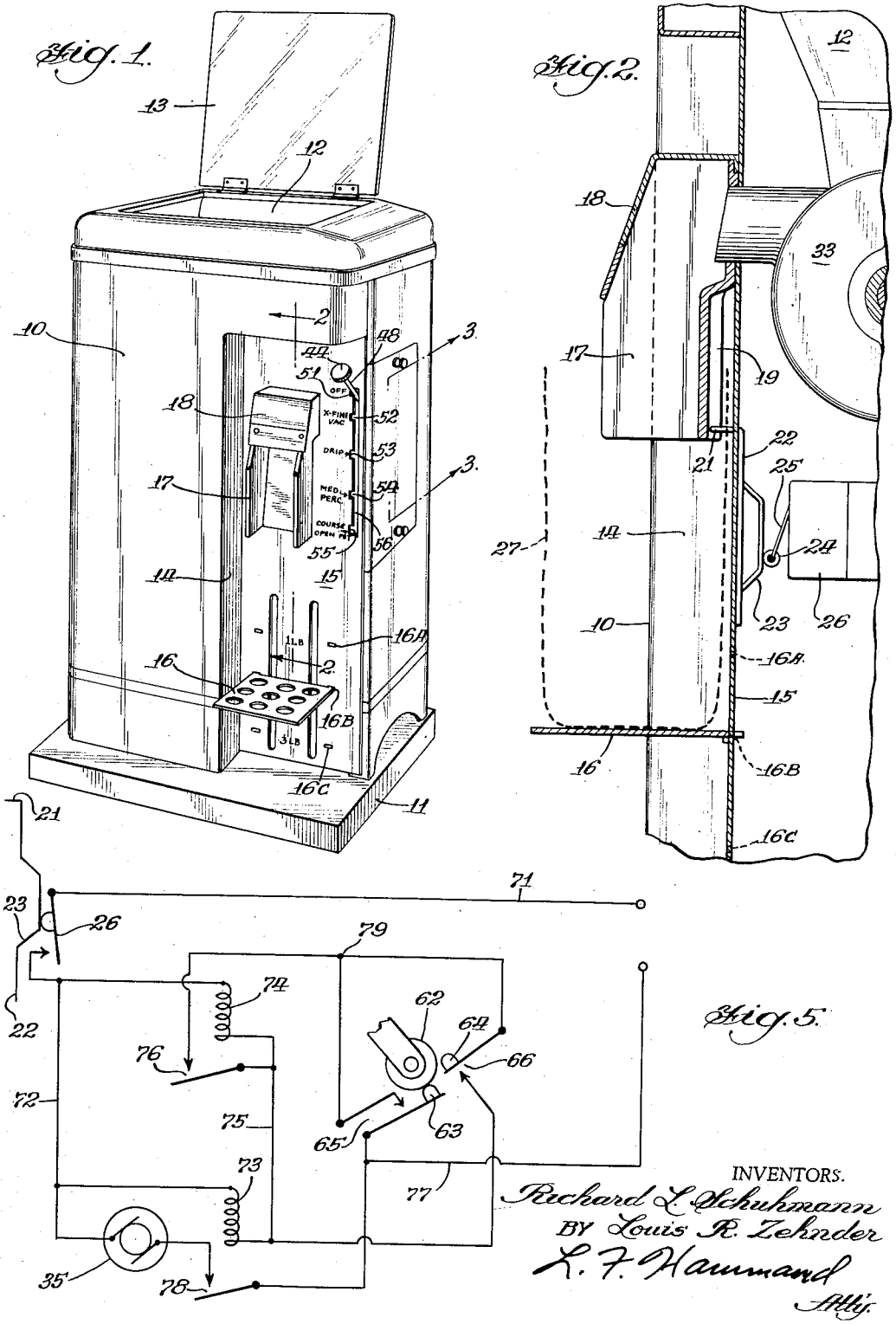
INVENTORS.
Richard L. Schuhmann
BY Louis R. Zehnder
L. F. Hammand
Atty.

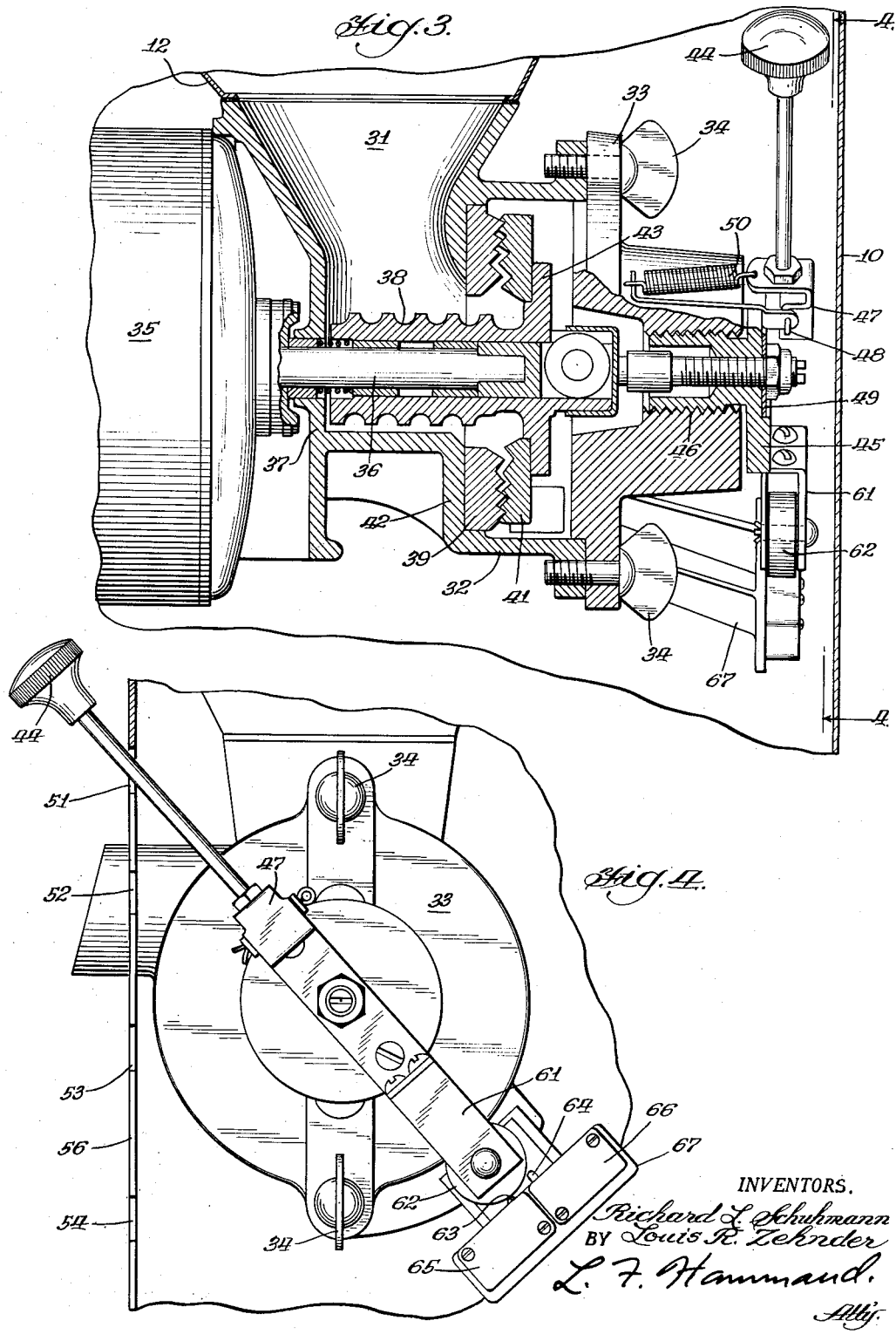

United States Patent Office 2,900,140
Patented Aug. 18, 1959

2,900,140

COFFEE GRINDER

Richard L. Schuhmann and Louis R. Zehnder, Louisville, Ky., assignors to American Duplex Co., Louisville, Ky., a corporation of Kentucky Application April 2, 1957, Serial No. 650,278

6 Claims. (Cl. 241—36)

This invention relates to coffee grinders, and more specifically to electrically driven grinders of the type commonly employed in retail stores or supermarkets for self-service grinding by the customers. It is characteristic of such devices that they are adjustable to grind successive small batches of coffee beans in varying degrees of fineness, in accordance with the preferences of the customer in order to suit the grind to the particular type of coffee maker for which the coffee is intended.

It is a primary object of the present invention to provide a coffee grinder with unique control instrumentalities, so designed and arranged as to facilitate quick, easy and convenient operation of the machine yet to avoid the errors in operation heretofore commonly experienced as a result of operation of grinders by persons unfamiliar with them.

In introduction to the disclosure it may be explained that it has become common practice to provide retail grocery stores, super-markets and similar establishments with self-service coffee grinders whereby the customer may select a package of coffee beans, pour them into the hopper of a conveniently located grinder, and grind the coffee, with the desired degree of fineness manually selected by manipulation of appropriate controls on the machine. This technique of coffee merchandising is of considerable advantage both to the merchant and the customer, since it means that the merchant need not carry the unnecessarily large inventory required to have an adequate supply of all grinds, while the customer is assured that the coffee is freshly ground at the instant of purchase.

Difficulties have been encountered by prior machines, however, in that the customers are often completely unfamiliar with the mode of operation of the grinder, and are thus apt to make mistakes in operation, causing customer dissatisfaction and loss to the merchants. One mistake commonly made is that the customer may start the grinder without first setting the grind control to their own choice of grind, and may get the grind desired by the prior user of the machine rather than their own selection. For example, if the machine has been left by the previous customer, with a setting of "coarse" grind, a customer desiring "drip" or "percolator" grind may not detect his error in time to correct the setting of the machine. Obviously this causes dissatisfaction if the customer nevertheless proceeds to purchase the undesired package. Also, it results in a loss to the merchant if the customer leaves the undesired package of ground coffee on the shelf and grinds a new bag.

Another obvious mistake to be avoided is the spilling of coffee, particularly of the ground coffee. This frequently results from starting the grinder without first positioning a receptacle under the coffee discharge spout. It has been heretofore proposed to overcome this disadvantage by the provision of a so-called "spout switch" whereby the machine will not start unless a bag is positioned under the spout, yet practical experience has shown that, even with the presence of the spout switch, the sudden starting of the machine as the bag is inserted over the discharge spout may startle the customer enough that the bag is dropped or spilled.

The present invention is believed to largely overcome the operating difficulties inherent in self-service coffee grinders of the past. To attain this result, the present inventor has provided a unique electro-mechanical control mechanism, whereby each successive customer operating the machine will be required to consciously select the grind of their choice; and to do so after the coffee bag is placed in position under the spout of the machine. The arrangement is such that while the machine cannot be operated until the bag is positioned on the spout, yet this will not, of itself, start the machine. The grinding can be started only by deliberately moving the control handle of the machine from its "off" position to one of the several possible grind selections.

The preferred apparatus for accomplishing the aims of this invention are best described in connection with the drawings attached to and forming a part of this specification, wherein:

Figure 1 is a front perspective view of a coffee grinder according to this invention;

Figure 2 is a detail sectional view through the discharge spout of the machine, taken substantially on the plane of the line 2—2 of Figure 1;

Figure 3 is a fragmental detail sectional view taken substantially on the plane of the line 3—3 of Figure 1 and showing the internal grinding mechanism of the machine;

Figure 4 is a detail sectional view taken substantially on the plane of the line 4—4 of Figure 3 and showing the arrangement of the grind selector control handle, and Figure 5 is a diagrammatic illustration of the electrical circuit of the device.

As illustrated, the mechanism is enclosed within a housing 10 mounted on a base 11 with a hopper 12 at the top of the machine covered by a hinged cover 13. The housing is preferably of sheet metal, and may have one side of its front wall offset inwardly at 14 to a vertical panel 15 on which a shelf 16 is adjustably mounted. The shelf 16 is disposed directly below the coffee discharge spout 17 so that the upper end of the bag used to receive the coffee may be telescoped over the bottom of the spout, and the bag rested on the shelf. The shelf is arranged for alternative positioning at different elevations to hold paper bags of different sizes. For example, the positions indicated at 16A, 16B and 16C, may correspond to bags of 1 lb., 2 lb., and 3 lb. size respectively.

The spout 17 is fixedly mounted near the upper end of panel 15 with a hood 18 over the top of the spout and with a vertical groove 19 in its back wall to receive a forwardly projecting finger 21 carried by a vertical slide 22. The slide has suitable mounting means (not shown) and is provided with a cam 23 adapted to bear against the roller 24 on the operating arm 25 of a spout switch 26. The arrangement is such that the switch 26 is normally open when the slide 22 and cam 23 are in their lowermost position but is automatically closed when the receptacle (indicated in dotted lines in Figure 2) is slid up over the lower end of the spout, lifting the finger 21.

The grinding instrumentalities utilized by the machine may be conventional. As illustrated, the grinder consists of a pedestal-mounted casting having an inlet funnel 31 fitted to the lower end of the hopper 12 and forming a part of a grinder housing 32 upon which a headplate 33 is removably held by thumb screws 34. The mounting pedestal (not shown) may be integral with the housing, and a driving motor 35 is arranged so that its armature shaft 36 projects through a back wall 37 of the housing 32 and mounts a feed screw 38 adapted to advance coffee beans entering the funnel 31 to the grinding burrs 39 and 41. These burrs are relatively shiftable with respect to each other, with the burr 39 stationarily mounted on the flange 42 of the wall 37 of the grinder housing, while the burr 41 is carried on a flange 43 integral with the outer end of the feed screw 38.

The fineness of the grind is adjusted by varying the spacing between the burrs 39 and 41. This may be accomplished in any conventional manner, but with the grinder illustrated it is varied in accordance with the adjustment of the grind selector handle 44 which serves to rotate the end plate 45 on the adjusting screw 46 of the grinder. The handle 44 is mounted on the end flange 45 by a suitable bracket 47, hinged on a crosspin 48 carried on an end plate 49. The bracket is provided with a tension spring 50 whereby the shank of the handle may snap into any one of a plurality of notches 51, 52, 53, 54 or 55 formed along one edge of the slot 56. In the commercial embodiment of the invention the notch 51 is the "off" position and the notches 52, 53, 54 and 55 represent "fine" grind, "drip" grind, medium or "percolator" grind and coarse or "open pot" grind, respectively.

The selector handle 44 serves not only as the grind adjustment, but also as the manual control of the electrical circuit of the device. This is by a bracket 61, mounted on the end plate 49 and extending angularly downwardly, (Figure 4) with a roller 62 at its lower end adapted to engage the control pins 63 and 64 of a pair of switches 65 and 66 mounted in side-by-side relation on a bracket 67 projecting from the grinder housing. The switch 65 is of the normally closed type but is so positioned that its pin 63 will be depressed by the roller and held in open position with the selector handle 44 in its uppermost or "off" location. The switch 66 is of the normally open type, but with its pin 64 disposed immediately adjacent to the roller 62 so that the switch is momentarily closed as the control handle is moved from the "off" notch 51.

The control instrumentalities of the unit are diagrammed in Figure 5. The lead 71 from one side of the power lines extends through the spout switch 26. The other lead 72 from the switch extends to the motor 35 and also to the winding 73 of a power relay and the winding 74 of a control or "holding" relay. These windings are in parallel with each other, with their opposite ends joined by a lead 75 extending to the switch 66 and to the holding contacts 76. The motor is connected to the other conductor 77 of the power line through breaker contacts 78 on the power relay. The conductor 77 of the power line also extends to the switch 65, and thence through the lead 79 to the switch 66 and holding contacts 76.

Since the "start" switch 66 is shunted by the holding contacts 76 of the control relay 74, and since switch 65 is always closed whenever switch 66 closes, any momentary closing of the switch 66 (when the spout switch 26 is closed) establishes a holding circuit through the contacts 76 and holds both relays 73 and 74 closed. The circuit from the motor 35 is thus completed from line 77 through the breaker contacts 78 to the spout switch 26 and thence to conductor 71 of the line.

In the normal and correct operation of the device, the customer selects a bag of bean coffee, pours its contents into hopper 12, and places the empty bag on the shelf 16 of the machine with the mouth of the bag telescoped over the lower end of the spout 17 to receive the ground coffee. The machine is then started by moving the selector handle 44 from its "off" position to the position of any desired grind. When the grind is completed the machine may be stopped by returning the handle 44 to "off" position.

Positioning the empty bag over the discharge spout of the machine closes the spout switch 26, completing a circuit from the line conductor 71 (Figure 5) to the driving motor 35 as well as to the windings of power relay 73 and control relay 74. The motor 35 does not yet start, however, since the breaker contacts 78 of the power relay 73 are open.

When the selector handle 44 is moved downwardly, (Figure 4) the roller 62 leaves the pin 63 and overrides the control pin 64 of the starting switch 66, closing the circuit through relays 73, 74 momentarily as the handle is moved toward one of the notches 52—55, corresponding to the selected grind. The momentary closing of the starting switch 66 completes a holding circuit from the line 77 through switch 65 and through both relays 73, 74 and the breaker contacts 78 of the power relay 73 close, completing the circuit through the motor 35. Further downward movement of the handle 44 moves the roller 62 beyond the control pin 64 of starting switch 66 and reopens the switch, but the holding contacts 76 of relay 74 are in parallel with the switch 66 and the circuit through these contacts holds both relays closed during the grinding operation. Motor operation thus continues until the selector handle is returned to "off" position, or until the bag is removed from the discharge spout, opening the spout switch 26. In either event, the circuit through the relays is interrupted and the contacts 76, 78 are opened by spring tension.

In the event that a user of the machine leaves the handle 44 in one of the grind positions rather than returning it to its "off" position at the top of the slot 56, the motor will not be started by positioning of the coffee bag on the spout and the mechanism will remain inactive until the closing of the spout switch has been followed by lifting the selector handle 44 substantially to its "off" position. This precludes the possibility of inadvertently starting the machine with the grind selection left by a prior customer, and requires that the user manipulate the selector lever and make a conscious selection of the grind desired to initiate each operation of the machine.

From the above it will be apparent that the present arrangement provides control instrumentalities for a coffee grinder whereby easy, quick, convenient and reasonably foolproof operation may be accomplished, even by persons entirely unskilled in mechanics and unfamiliar with the mode of operation of the mechanism.

Having thus described our invention, what we claim as new and desire to protect by United States Letters Patent is:

1. In a coffee grinder including a mill, a driving motor for said mill, a feed hopper, a discharge spout and a grind adjustment control device including a selector handle shiftable between a plurality of different grind positions, the combination of interlocking electrical control apparatus to prevent inadvertent improper operation of the mill, said apparatus comprising a power relay having breaker contacts in the circuit of the aforementioned driving motor, a control relay having its winding in parallel with the winding to the power relay and its contacts included in a holding circuit to maintain said power relay in closed position; together with a spout switch actuated by the positioning of a receptacle on the spout of the mill and in series with the motor; interrupter contacts actuated by the selector handle to release the power relay and open the circuit through the motor upon movement of said handle to a position remote from one of the aforesaid grind positions; and a starting switch actuated by the selector handle upon movement toward one of the grind positions whereby operation of the mill can be initiated only by manipulation of the selector handle after the spout switch has been closed by a receptacle positioned on the spout of the mill.

2. In a coffee grinder including a mill, a driving motor for said mill, a feed hopper, a discharge spout and a grind adjustment control device including a selector handle shiftable between a plurality of different grind positions, the combination of interlocking electrical control apparatus to prevent inadvertent improper operation of the mill, said apparatus comprising a power relay having breaker contacts in the circuit of the aforementioned driving motor, a control relay having its winding in parallel with the winding to the power relay and its contacts included in a holding circuit to maintain said power relay in closed position; together with interrupter contacts actuated by the selector handle to release the power relay and open the circuit through the motor upon movement of said handle to a position remote from one of the aforesaid grind positions; and a starting switch actuated by the selector handle upon movement toward one of the grind positions whereby operation of the mill can be initiated only by manipulation of the selector handle after the spout switch has been closed by a receptacle positioned on the spout of the mill.

3. In a coffee grinder including a mill, a driving motor for said mill, a feed hopper, a discharge spout and a grind adjustment control device including a selector handle shiftable between a plurality of different grind positions, the combination of interlocking electrical control apparatus to prevent inadvertent improper operation of the mill, said apparatus comprising a power relay having breaker contacts in the circuit of the aforementioned driving motor, a holding circuit to maintain said power relay in closed position; together with a spout switch to complete one side of the circuit to the motor by the positioning of a receptacle on the spout of the mill, and interrupter contacts actuated by the selector handle to break the holding circuit; and a starting switch actuated by the selector handle whereby operation of the mill can be initiated only by manipulation of the grind selector handle after the spout switch has been closed by a receptacle positioned on the spout of the mill.

4. In a coffee grinder including a mill, a driving motor for said mill, a feed hopper, a discharge spout and a grind adjustment control device including a selector handle shiftable between a plurality of different grind positions, the combination of interlocking electrical control apparatus to prevent inadvertent improper operation of the mill, said apparatus comprising a spout switch in series with the motor to complete one side of the circuit to the motor by positioning of a receptacle on the spout of the mill; a starting switch for said motor actuated by the selector handle upon movement toward one of the grind positions, breaker contacts in the circuit of the aforementioned driving motor, a holding circuit for said motor, and interrupter contacts actuated by the selector handle to open the holding circuit and circuit through the motor upon movement of said handle to a position remote from one of the aforesaid grind positions.

5. In a coffee grinder including a mill, a driving motor for said mill, a feed hopper, a discharge spout and a grind adjustment control shiftable between an "off" position and a plurality of different grind positions, the combination of interlocking electrical control apparatus to prevent inadvertent improper operation of the mill, comprising a spout switch actuated by positioning a receptacle on the spout of the mill, a starting switch adapted to be closed and instantly reopened by movement of the grind adjustment control from the "off" position toward one of the grind positions, and an electrical circuit adapted to be closed and maintained in a closed position as a result of the initial contemporaneous actuation of said spout switch and said starting switch.

6. In a coffee grinder including a mill, an electric motor for driving said mill, a feed hopper, a discharge spout and a grind adjustment control shiftable between an "off" position and a plurality of different grind positions, the combination of interlocking electrical control apparatus to prevent inadvertent improper operation of the mill, comprising a spout switch actuated by positioning a receptacle on the spout of the mill, a starting switch adapted to be closed and instantly reopened by movement of the grind adjustment control from the "off" position toward one of the grind positions, and an electrical circuit adapted to be closed and maintained in a closed position as a result of the initial contemporaneous actuation of said spout switch and said starting switch until said grind adjustment control is returned to the "off" position or said spout switch is opened by removing the receptacle for the ground coffee.

References Cited in the file of this patent

UNITED STATES PATENTS

| | | |
|---|---|---|
| 1,826,477 | Olp | Oct. 6, 1931 |
| 2,060,807 | Johnson | Nov. 17, 1936 |
| 2,090,634 | Meeker | Aug. 24, 1937 |
| 2,251,376 | Ross | Aug. 5, 1941 |
| 2,309,246 | Henry | Jan. 26, 1943 |
| 2,522,643 | Schumann et al. | Sept. 19, 1950 |